United States Patent
Farquhar et al.

(10) Patent No.: US 7,894,960 B2
(45) Date of Patent: Feb. 22, 2011

(54) ACTIVE HEAD RESTRAINT FOR A VEHICLE SEAT

(75) Inventors: Mark A. Farquhar, Ortonville, MI (US); Arjun Yetukuri, Rochester Hills, MI (US); Eric Veine, Wixom, MI (US)

(73) Assignee: Lear Corporation, Southfield, MI (US)

( * ) Notice: Subject to any disclaimer, the term of this patent is extended or adjusted under 35 U.S.C. 154(b) by 331 days.

(21) Appl. No.: 12/060,423

(22) Filed: Apr. 1, 2008

(65) Prior Publication Data

US 2009/0243354 A1  Oct. 1, 2009

(51) Int. Cl.
*B60R 22/00* (2006.01)
*B60N 2/42* (2006.01)

(52) U.S. Cl. .................. 701/45; 701/49; 297/216.12

(58) Field of Classification Search ............ 297/216.12; 701/45, 49
See application file for complete search history.

(56) References Cited

U.S. PATENT DOCUMENTS

| | | | |
|---|---|---|---|
| 5,882,060 A | 3/1999 | Walk et al. | |
| 6,088,640 A | 7/2000 | Breed | |
| 6,607,242 B2 | 8/2003 | Estrada et al. | |
| 6,746,078 B2 | 6/2004 | Breed | |
| 6,805,404 B1 | 10/2004 | Breed | |
| 6,830,278 B2 | 12/2004 | Yoshizawa et al. | |
| 6,983,989 B1 | 1/2006 | Veine et al. | |
| 7,145,263 B2 | 12/2006 | Nathan et al. | |
| 7,350,860 B2 | 4/2008 | Sakai | |
| 7,445,282 B2 * | 11/2008 | Sakai | 297/216.12 |
| 7,448,677 B2 | 11/2008 | Sakai et al. | |
| 2003/0227199 A1 | 12/2003 | Yoshizawa et al. | |
| 2004/0129478 A1 | 7/2004 | Breed et al. | |
| 2005/0017488 A1 | 1/2005 | Breed et al. | |

(Continued)

FOREIGN PATENT DOCUMENTS

DE  102004032139 A1  1/2006

(Continued)

OTHER PUBLICATIONS

James B. Treece, "Lexus LS460 adds self-parking, deletes safety gear", Automotive News Europe, Sep. 18, 2006, 1 page.

(Continued)

*Primary Examiner*—Milton Nelson, Jr.
(74) *Attorney, Agent, or Firm*—Brooks Kushman P.C.

(57) ABSTRACT

An active head restraint system is disclosed with an actuator, a sensor, and a controller. The controller receives an impact signal from a triggering element, receives the position of an occupant's head, actuates the head restraint to move towards the occupant's head, and controls actuation to optimize head restraint movement as the head restraint moves proximate to the occupant's head. In another embodiment, the controller also manipulates head restraint velocity to optimize the velocity toward the occupant's head. Also presented is a method for actuating an active head restraint system for a vehicle seat. The method includes sending an impact signal to a controller, receiving the position of an occupant's head, transmitting the received position of the occupant's head to a controller, actuating the head restraint to move towards the occupant's head, and controlling head restraint actuation to optimize head restraint movement as it moves proximate to the occupant's head.

20 Claims, 3 Drawing Sheets

U.S. PATENT DOCUMENTS

| | | | |
|---|---|---|---|
| 2006/0186713 A1 | 8/2006 | Breed | |
| 2007/0027599 A1 | 2/2007 | Sakai et al. | |
| 2007/0176473 A1 | 8/2007 | Sakai et al. | |
| 2008/0111407 A1* | 5/2008 | Szablewski | 297/216.12 |
| 2008/0262679 A1 | 10/2008 | Baumann et al. | |
| 2009/0062989 A1* | 3/2009 | Sakai et al. | 701/45 |

FOREIGN PATENT DOCUMENTS

| | | |
|---|---|---|
| DE | 60301591 T2 | 6/2006 |
| DE | 102007000047 A1 | 8/2007 |

OTHER PUBLICATIONS

Lexus LS and machine translation, 10 pages, 2006.

Stuart Waterman, "Japanese market Lexus LS460 boasts a host of 'world's firsts'", AUTOBLOG, Sep. 19, 2006, accessed via www.google.com.

Yuri Kageyama, Businessweek/Online, "Toyota device aims to cut rear crashes," Sep. 7, 2006.

* cited by examiner

ACTIVE HEAD RESTRAINT FOR A VEHICLE SEAT

BACKGROUND OF THE INVENTION

1. Field of the Invention

The present invention relates to an active head restraint for a vehicle seat.

2. Background Art

The prior art has offered active head restraint systems for actuating a head restraint of a vehicle seat in an impact condition. Various examples of active head restraints systems are known in the art. One example is U.S. Pat. No. 6,983,989 B1 which issued to Veine et al. on Jan. 10, 2006. Another example is U.S. Pat. No. 6,607,242 B2 which issued to Estrada et al. on Aug. 16, 2003. The disclosure of these references are incorporated in their entirety by reference herein.

DETAILED DESCRIPTION OF EMBODIMENTS OF THE INVENTION

As required, detailed embodiments of the present invention are disclosed herein; however, it is to be understood that the disclosed embodiments are merely exemplary of the invention and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Embodiments of the present invention provides additional benefits to active head restraints that those of the prior art lacked. What these prior art head restraints lack, however, is an ability to control the force upon which the head restraint contacts the occupant's head. That is, in prior art head restraints the amount of force utilized to actuate the head restraint is outputted against the occupant's head. Furthermore, the velocity of the head restraint upon impact is the same as the velocity directed toward the occupant's head. As such, while the active head restraint systems of the prior art reduce injury, injury can be further minimized by controlling the actuation of the head restraint.

Accordingly, an active head restraint system is disclosed that intelligently controls actuation of the head restraint upon, or prior to, contact with the occupant's head in an impact condition. Specifically, the system detects the position of the occupant's head relative to the head restraint as a function of distance and, with this information, manipulates the travel velocity and force of the head restraint. In this way, the head restraint can aid in further minimizing injury to the occupant.

In general, the system of the present invention involves a communication between various elements within the head restraint system which can detect the presence of an impact signal, the position of the occupant's head, and instruct the actuation of the head restraint in order to control its movement to optimize displacement, velocity, and contact forces imparted upon the occupant's head.

Figure 1:
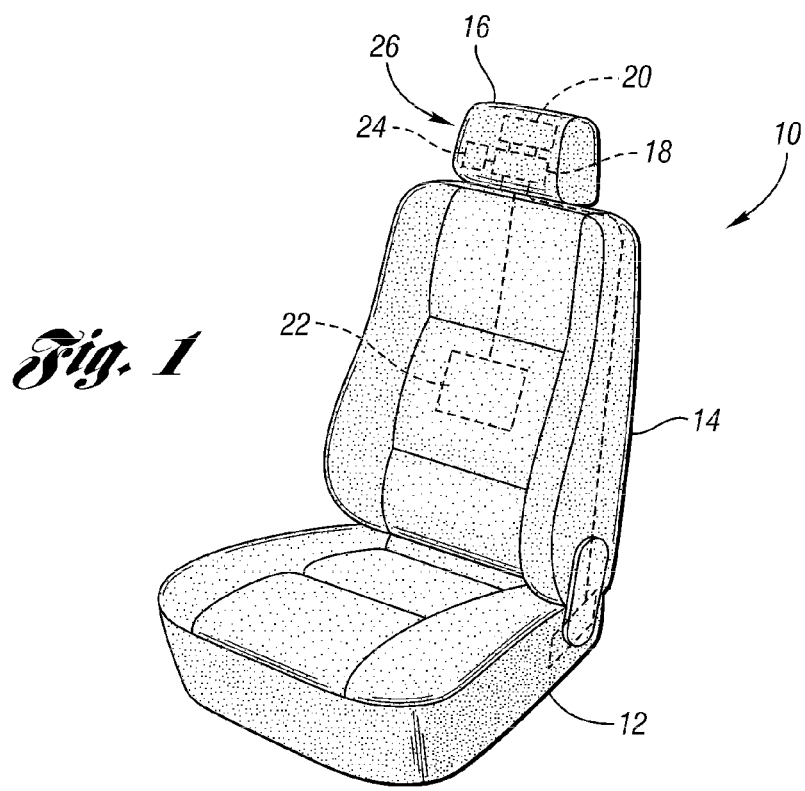
FIG. 1 is a perspective view of a vehicle seat and active head restraint system in accordance with an embodiment of the present invention.

With reference now to FIG. 1, a vehicle seat 10 is illustrated and referenced generally by numeral 10 for use in a vehicle, such as an automobile, a boat or an aircraft. The vehicle seat 10 includes a seat bottom 12 that is mounted within the vehicle. The seat 10 also includes a seat back 14 that is mounted to one of the seat bottom 12 or the vehicle. The seat 10 further includes a head restraint 16 mounted on top of the seat back 14. Additionally, the vehicle seat 10 includes a module 18 containing computer executable instructions to communicate with an actuator 20 for actuating the head restraint 16, a triggering element 22 for detecting the presence of an impact condition, and a sensor 24 for determining the distance of the occupant's head from the head restraint 16. A pre-crash sensor, such as an optical sensor, is located on the vehicle body.

The vehicle seat 10 may be provided anywhere within an associated vehicle, such as a front row seat, a second row seat or the like. The seat bottom 12 may be mounted directly to the vehicle floor or coupled to seat adjuster mechanisms for rails extending longitudinally to the vehicle floor and enabling longitudinal height and angular adjustment of the seat bottom 12 relative to the vehicle floor. The seat bottom 12 is conventional in design and can be constructed in accordance with any suitable manner including a structural frame covered by a foam pad layer and other finish cover material. The vehicle seat back 14 includes a frame which is formed from any suitable material that is sufficiently light in weight yet structurally sound for supporting the occupant and for withstanding appropriate testing requirements.

In the description, various embodiments and operating parameters and components of the embodiments described with directional language, such as "left," "right," "above," "below," "upper," "lower" and words of similar connotation designate directions shown in the drawings or are understood in the field of the art. Such directional terminology is used for relative description and clarity and is not intended to limit the orientation of any embodiment or component or any embodiment to a particular direction or orientation.

The vehicle seat 10 incorporates the active head restraint system 26 as is known in the art. The system 26 contains a module 18 located in the head restraint 16, containing computer executable instructions for communicating with a sensor 24, an actuator 20, and a triggering element 22. While the invention contemplates that the module's 18 location can be in the head restraint 16, the module 18 can be located anywhere in the vehicle seat 10 where it can also communicate with the sensor 24, the actuator 20, and the triggering element 22. The module 18 receives signal inputs from the triggering element 22, from which it detects an impact, including a received impact and an impending impact, and the sensor 24, from which it receives the distance of the occupant's head from the head restraint 16. The module 18 then outputs instructions to the actuator 20 to enable or disable the actuation of the head restraint 16. Further details of this process are described below with regard to FIGS. 2 and 3.

The system 26 further contains a triggering element 22 to detect the presence of any impact such as a frontal, rear or imminent impact. Upon the detection of an impact, the triggering element 22 sends a signal to the module that an impact event has occurred or will occur. Once inputted, the actuation of the active head restraint system 26 is triggered. Further details of this process are described below with respect to FIGS. 2 and 3. The triggering element 22 can be any vehicular impact detecting device known in the art. While the triggering element 22 can be located in any convenient location in the vehicle where an impact can be detected during an impact condition, the present invention contemplates the triggering element 22 being located in the vehicle seat 10.

Figure 1A:
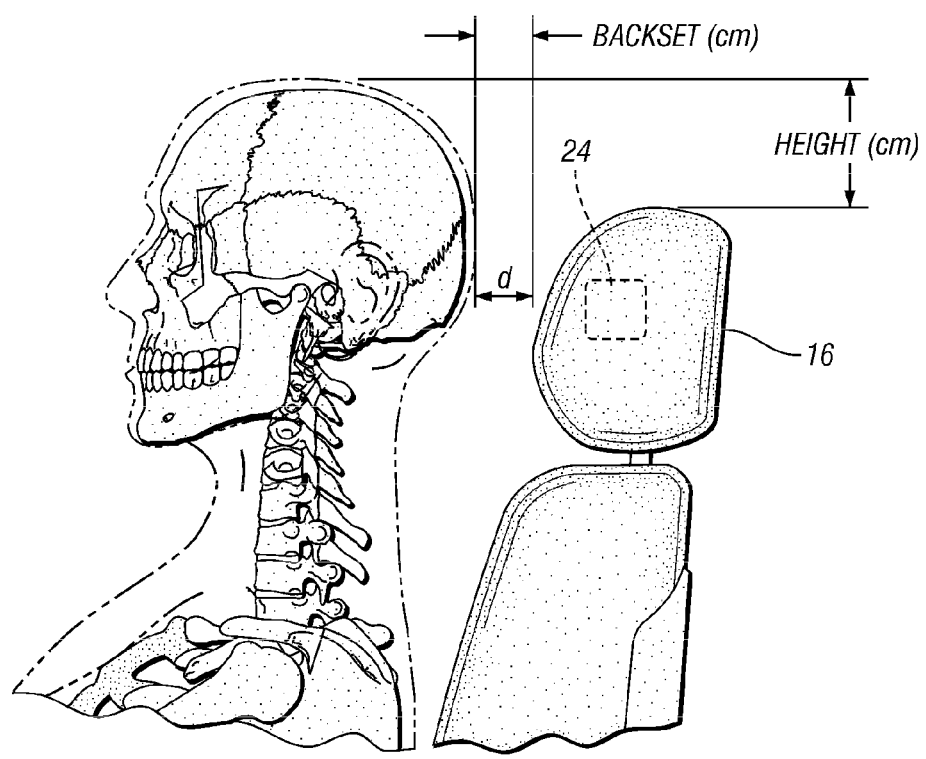
FIG. 1a is a perspective view of an active head restraint system and an occupant's head in accordance with an embodiment of the present invention.

As further depicted in FIGS. 1 and 1a, the system 26 further includes a sensor 24 located in the head restraint 16. The sensor 24 detects the distance of an occupant's head from the head restraint 16 as an input into the module 18. The module 18 then outputs instructions for actuating the head restraint 16 if the head is not in contact with the head restraint 16 and for disabling actuation if it is in contact with the head restraint 16. In one embodiment, the sensor 24 is constantly monitoring the distance of an occupant's head from the head restraint both before and during an impact event. The sensor 24 can be alternatively located in the vicinity of the head restraint 16, such as in a headliner. Thus, while the invention contemplates the sensor 24 being located in the head restraint 16, the sensor 24 can also be located in any vicinity to the head restraint 16 where the contact of the occupant's head with, or the distance of the head from, the head restraint 16 can be detected or measured. In another embodiment, after the active head restraint 16 is enabled, the sensor 24 is disabled at a predetermined time in order to prevent the head restraint 16 from pushing the occupant's head during rebound. In a further embodiment, while the sensor 24 is constantly detecting the distance of the head from the head restraint 16, the actuator's 20 movement changes with a change in distance of the occupant's head from the head restraint 16, during, for example, a double impact or rebound. The sensor 24 can be activated during any number of vehicular impact events. Furthermore, the impact events may include multiple impacts.

The system 26 also includes an actuator 20 located in the vehicle which works in communication with the triggering element 22 and the sensor 24, and under the control of the module 18, to prompt the active head restraint 26 toward the occupant's head in response to an impact signal. In one embodiment, the actuator 20 is a servomotor. Furthermore, while the invention depicts the actuator 20 as mounted to a vehicle seat 10, this is not the only embodiment. The actuator 20 can be located in any location of the vehicle where it can be in communication with the triggering element 22 and the sensor 24 and under the control of the module 18. Alternate embodiments of the actuator 20 are known in the art, such as stepper motors, solenoids, stored energy devices, springs, or the like.

Figure 2:
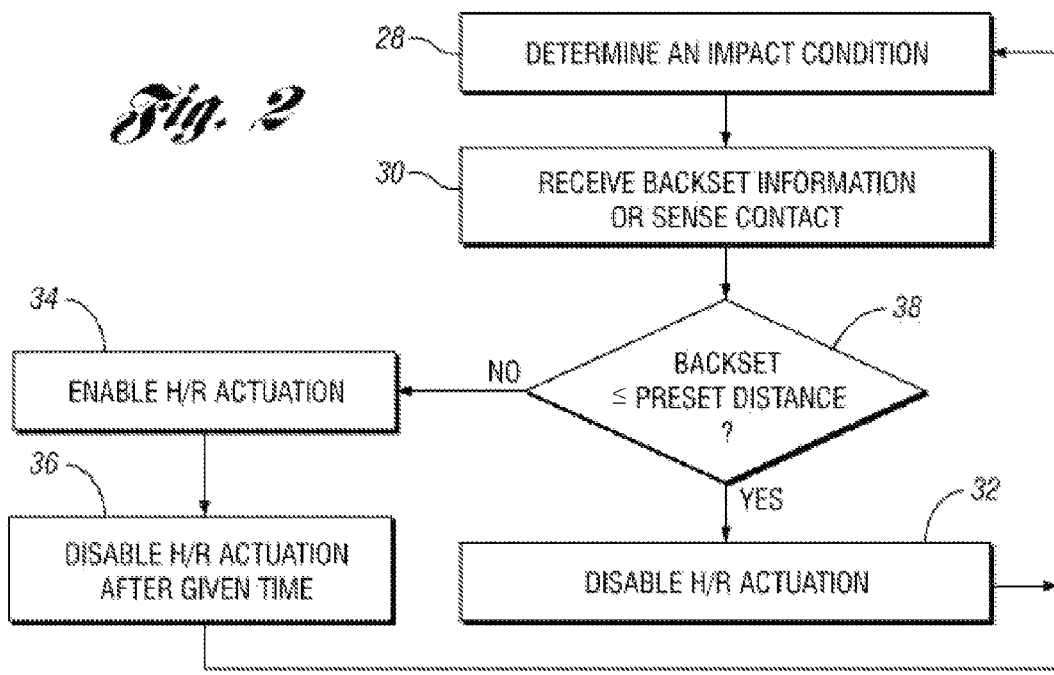
FIG. 2 is a flow chart for a method for actuating the active head restraint system of FIG. 1 according to an embodiment of the present invention.

FIG. 2 further illustrates the functionality of the active head restraint system 26 according to one embodiment of the invention. Upon the occurrence and detection of an impact event at block 28 by the triggering element 22, an impact signal is sent to the module 18. The module 18 receives the signal and sends instructions to the sensor 24 to estimate the distance at block 30, between the occupant's head and the head restraint 16 or to determine if the head is already in contact with the head restraint 16. In at least one embodiment, the distance between the occupant's head and the head restraint is periodically monitored, even when there is no impact event. In an alternate embodiment, the periodic monitoring of the distance between the head restraint 16 and occupant's head by the sensor 24 will cause the actuator's 20 movement to change according to the distance determined by the sensor 24. At block 38, once the distance or contact is determined, a decision is made by the module 18: if the occupant's head is already in contact with the head restraint 16 (backset=0) at impact, then head restraint actuation is disabled at block 32. If the sensor 24 determines that the head is not in contact with the head restraint 16, the information is sent to the module 18 and instructions are consequently transmitted to the actuator 20 to enable head restraint actuation in block 34. During enablement and after a given time, further instructions from the module 18 are sent to the actuator 20 to disable head restraint actuation at block 36 in order to prevent the head restraint 16 from pushing the occupant's head during rebound. Furthermore, if there is a secondary impact repeated at block 28, the impact condition will be detected and the sensor 24 will send a signal to module 18 to re-enable actuation by block 34 of the active head restraint system 26 as discussed above.

Figure 4:
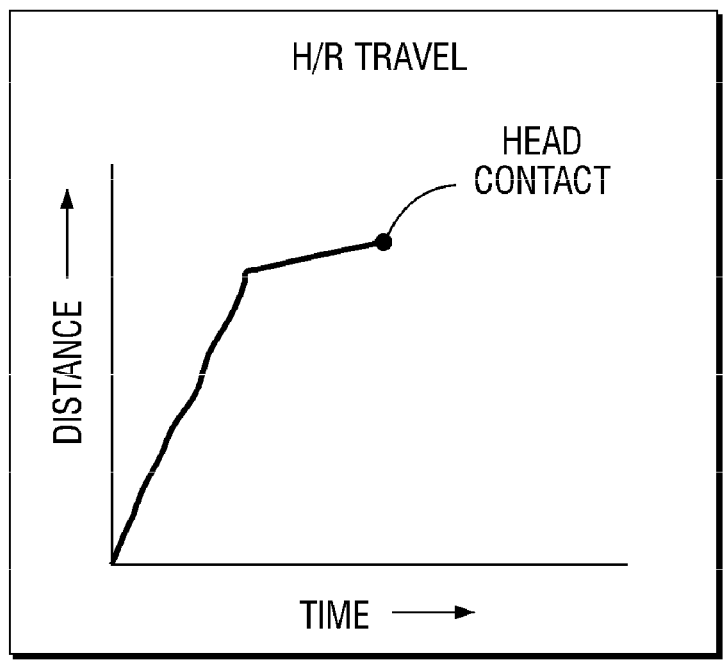
FIG. 4 is a graphical representation of the speed during actuation of the head restraint of the seat of FIG. 1.

FIG. 4 is a graphical representation of the embodiment of FIG. 2. It illustrates head restraint travel speed based on time as a function of distance. The abscissa, or x-axis, is the time the head restraint 16 travels starting from the time of occurrence of an impact condition to contact with the head. The ordinate, or y-axis, is the distance that the head restraint 16 travels starting from the occurrence of the impact condition to the time of contact with the occupant's head. As represented in FIG. 4, once an impact condition occurs, the head restraint 16 travels at a first velocity prior to contact with the occupant's head. At a certain time, as empirically determined or set by an OEM, the head restraint 16 velocity automatically slows down as represented by the shift in the graph line representing the travel velocity of the head restraint 16.

Figure 3:
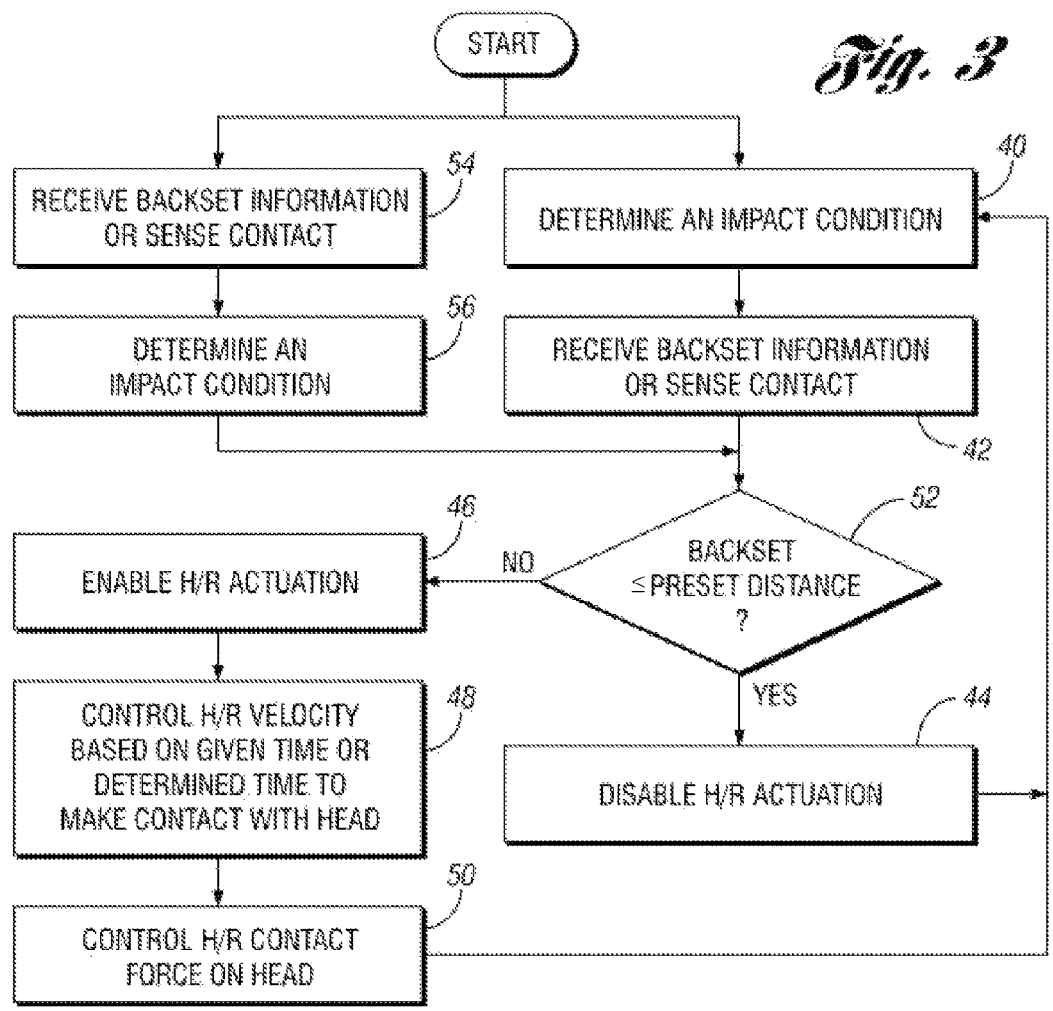
FIG. 3 is a flow chart for a method for actuating the active head restraint system of FIG. 1 according to another embodiment of the present invention.

FIG. 3 provides an illustration of the functionality of the active head restraint system 26 in another embodiment. The detection of the impact condition occurs at block 40. The distance of the occupant's head from the head restraint is determined at block 42. Upon the occurrence and detection of an impact event at block 40 by the triggering element 22, an impact signal is sent to the module 18. The module 18 receives the signal and sends instructions to the sensor 24 to estimate the distance at block 42, between the occupant's head and the head restraint 16 or to determine if the head is already in contact with the head restraint 16. In another embodiment, instructions are sent to the sensor 24 to measure the distance periodically at block 54 and to store this information prior to detecting an impact condition at block 56. This periodic monitoring of the distance between the head restraint 16 and the occupant's head by the sensor 24 will cause the actuator's 20 movement to change according to the distance determined by the sensor 24. At block 52, once the distance or contact is determined, a decision is made by the module 18: if the occupant's head is already in contact with the head restraint 16 (backset=0) at impact, then head restraint actuation is disabled at block 44. If the sensor 24 determines that the head is not in contact with the head restraint 16, the information is sent to the module 18 and instructions consequently transmitted to the actuator 20 to enable head restraint actuation in block 46. Once enabled, the module 18 transmits instructions to control the velocity or force of the head restraint 16 at a given time in block 48. The given time is determined using empirical data or is automatically set by an original equipment manufacturer (OEM). The module 18 can calculate the time required to make contact with the back of the head as a function of distance at block 48. The system 26 can then be instructed to control the velocity or force at block 50, for example, by reducing the acceleration of the head restraint 16 prior to contact with the occupant's head, as a function of the distance traveled by the head restraint 16, or as a function of the calculated time to the occupant's head.

Figure 5:
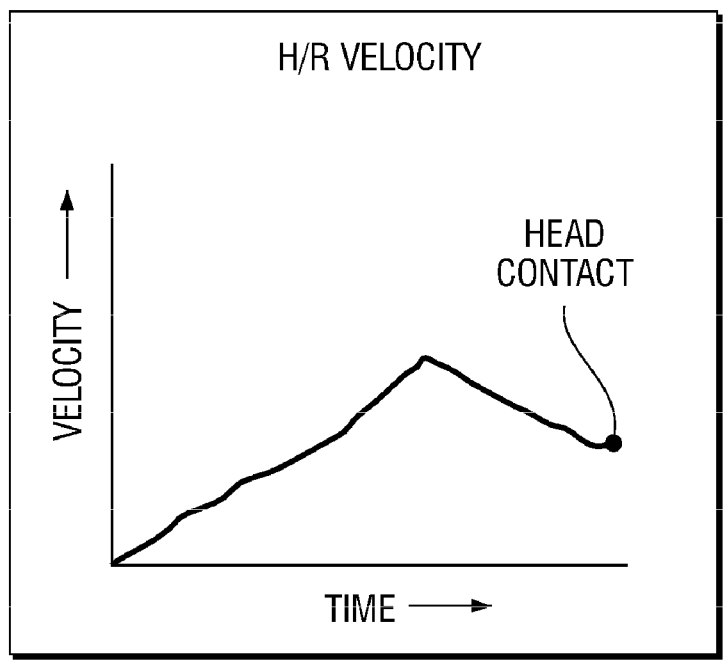
FIG. 5 is a graphical representation of the force during actuation of the head restraint of the seat of FIG. 1.

FIG. 5 is a graphical representation of the embodiment of FIG. 3. It illustrates head restraint 16 force based on distance. The abscissa, or x-axis, is the time the head restraint 16 travels starting from the time of occurrence of an impact condition to contact with the head. The ordinate, or y-axis, is the velocity with which the head restraint 16 travels. As represented in FIG. 5, once an impact condition occurs, the head restraint 16 travels at a first rate of acceleration. At a certain time, however, the velocity is decreased by decelerating the head restraint 16 prior to contact with the occupant's head as represented by the shift in the graph line representing the acceleration of the head restraint 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An active head restraint system comprising:
    an actuator adapted to be mounted to a vehicle seat for actuating a head restraint;
    a sensor for detecting a position of an occupant's head relative to the head restraint; and
    a controller in communication with the actuator, the sensor, and a triggering element for detecting a current or impending impact event, the controller comprising computer executable instructions to:
    receive an impact signal;
    receive the position of the occupant's head relative to the head restraint as input to determine whether to enable actuation of the head restraint;
    actuate the head restraint to move towards the occupant's head based on the input; and
    control head restraint actuation in response to the impact signal and the position of the occupant's head relative to the head restraint to optimize movement of the head restraint as the head restraint moves proximate to the occupant's head.

2. The active head restraint system of claim 1 further comprising the triggering element for detecting an impact event.

3. The active head restraint system of claim 1 wherein the sensor transmits a signal to enable the actuator when the head is not in contact with the head restraint, the actuator being enabled during one or more instances of non-contact.

4. The active head restraint system of claim 3 wherein the controller further comprises computer executable instructions to:
    receive a frontal impact signal from the triggering element which enables head restraint actuation;
    receive the position of the occupant's head relative to the head restraint;
    actuate the head restraint to move towards the occupant's head; and
    control head restraint actuation in response to the impact signal and the position of the occupant's head relative to the head restraint to optimize movement of the head restraint as the head restraint moves proximate to the occupant's head.

5. The active head restraint system of claim 1 wherein at least one of the sensor and actuator are disabled after a predetermined time after impact.

6. The active head restraint system of claim 5 wherein the controller further comprises computer-executable instructions to:
    identify a secondary impact; and
    re-enable at least one of the sensor and the actuator when the head is not in contact with the head restraint.

7. The active head restraint system of claim 1 wherein the controller further comprises computer-executable instructions to disable head restraint actuation if the occupant's head is in contact with the head restraint.

8. An active head restraint system comprising:
    an actuator adapted to be mounted to a vehicle seat for actuating a head restraint;
    a sensor for detecting a position of an occupant's head relative to the head restraint; and
    a controller in communication with the actuator, the sensor, and a triggering element for detecting a current or impending impact event, the controller comprising computer executable instructions to:
    receive an impact signal;
    receive the position of the occupant's head relative to the head restraint as input to determine whether to enable actuation of the head restraint;
    actuate the head restraint to move towards the occupant's head based on the input; and
    manipulate a velocity of the head restraint during actuation in response to the position of the occupant's head to optimize the velocity of the head restraint toward the occupant's head.

9. The active head restraint system of claim 8 further comprising the triggering element for detecting an impact event.

10. The active head restraint system of claim 8 wherein the sensor transmits a signal to enable the actuator when the head is not in contact with the head restraint, the actuator being enabled during one or more instances of non-contact.

11. The active head restraint system of claim 10 wherein the controller further comprises computer executable instructions to:
    receive a frontal impact signal from the triggering element which enables head restraint actuation;
    receive the position of the occupant's head relative to the head restraint;
    actuate the head restraint to move towards the occupant's head; and
    control head restraint actuation in response to the impact signal and the position of the occupant's head relative to the head restraint to optimize movement of the head restraint as the head restraint moves proximate to the occupant's head.

12. The active head restraint system of claim 8 wherein the controller further includes computer-executable instructions to disable head restraint actuation if the occupant's head is in contact with the head restraint.

13. The active head restraint system of claim 8 wherein the controller further comprises computer executable instructions to decelerate the head restraint prior to contact with the occupant's head to reduce the velocity at which the occupant's head contacts the head restraint.

14. The active head restraint system of claim 8, wherein the controller further comprises computer-executable instructions to control a travel velocity of the head restraint as a function of a distance traveled wherein a first travel velocity is greater than a second travel velocity at which the occupant's head contacts the head restraint.

15. The active head restraint system of claim 14 wherein the travel velocity of the head restraint changes at a predetermined time.

16. The active head restraint system of claim 8, wherein the controller further comprises computer executable instructions to decelerate the head restraint prior to contact with the occupant's head to reduce the force at which the head restraint contacts the occupant's head to be controlled.

17. The active head restraint system of claim 8 wherein the controller further comprises computer executable instructions to:
   determine a time required for the head restraint to contact the occupant's head as a function of distance; and
   control the velocity of the head restraint as a function of the determined time to the occupant's head.

18. The active head restraint system of claim 8 wherein the controller further comprises computer executable instructions to control the force at which the head restraint contacts the occupant's head as a function of a determined time required for the head restraint to make contact with the occupant's head.

19. A method for actuating an active head restraint system for a vehicle seat, the method comprising:
   sending an impact signal to a controller in response to a current or impending impact event;
   receiving a position of an occupant's head relative to the head restraint;
   transmitting the received position of the occupant's head relative to the head restraint to a controller in order to determine whether to enable actuation of the head restraint;
   actuating the head restraint to move towards the occupant's head based on the determination; and
   controlling head restraint actuation in response to the impact signal and the position of the occupant's head to optimize movement of the head restraint as the head restraint moves proximate to the occupant's head.

20. The method of claim 19 further comprising:
   estimating the position of the occupant's head relative to the head restraint; and
   manipulating a velocity of the head restraint during actuation in response to the position of the occupant's head to optimize the velocity of the head restraint during contact with the occupant's head.

* * * * *